(12) United States Patent
Hoover et al.

(10) Patent No.: US 10,308,038 B2
(45) Date of Patent: Jun. 4, 2019

(54) UNIVERSAL PART HOLDER WITH CONFORMABLE MEMBRANES

(71) Applicant: XEROX CORPORATION, Norwalk, CT (US)

(72) Inventors: Linn C Hoover, Webster, NY (US);
Paul M Fromm, Rochester, NY (US);
Erwin Ruiz, Rochester, NY (US);
Jeffrey J Bradway, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 123 days.

(21) Appl. No.: 15/645,216

(22) Filed: Jul. 10, 2017

(65) Prior Publication Data

US 2019/0009572 A1    Jan. 10, 2019

(51) Int. Cl.
  *B41J 3/407*  (2006.01)
  *B25B 11/00*  (2006.01)
  *B25J 15/06*  (2006.01)

(52) U.S. Cl.
  CPC ............. *B41J 3/4073* (2013.01); *B25B 11/00* (2013.01); *B25J 15/0616* (2013.01)

(58) Field of Classification Search
  CPC ...... B41J 3/4073; B25B 11/00; B25J 15/0616
  See application file for complete search history.

(56) References Cited

U.S. PATENT DOCUMENTS 4,561,686 A * 12/1985 Atchley ................ B66C 1/0206
  294/188
6,135,654 A * 10/2000 Jennel ...................... B41J 2/01
  101/35

8,467,070 B2 * 6/2013 Diefenbacher ........ G01B 11/24
  356/601
8,882,165 B2 * 11/2014 Lipson ................. B25J 15/0023
  294/188
8,926,047 B2 * 1/2015 LaCaze .................. B41J 2/1752
  101/40
9,701,064 B2 * 7/2017 Donaldson ............. B41J 3/4073
(Continued)

FOREIGN PATENT DOCUMENTS

WO    WO 2006082100 A1 *  8/2006  ............. B23Q 3/086

OTHER PUBLICATIONS

WO 2006082100 A1—Aug. 2006—English Machine Translation.*
(Continued)

*Primary Examiner* — Marc Carlson

(57) ABSTRACT

An apparatus for holding three-dimensional parts for printing includes a frame with sides and a solid bottom and a part gripping membrane mounted across the face of the frame. A biasing membrane is mounted at the midpoint of the frame height to form an air chamber between the frame bottom and the biasing membrane and a vacuum chamber between the biasing membrane and the part gripping membrane positioned on the face of the frame. To grip a part, the gripping membrane is stretched over the part, positive pressure is applied to the air chamber to compress the granular material within the air chamber and further stretch the gripping membrane over the part, and then vacuum is applied to the vacuum chamber between the two membranes to maintain the granular material compression and grip on the part when air pressure is relieved from the air chamber.

19 Claims, 4 Drawing Sheets

(56) References Cited

U.S. PATENT DOCUMENTS

| | | | | |
|---|---|---|---|---|
| 9,827,784 | B1* | 11/2017 | Buchar | A63B 45/02 |
| 9,925,799 | B1* | 3/2018 | Fromm | B41J 3/4073 |
| 10,087,020 | B1* | 10/2018 | Ruiz | B65G 47/91 |
| 2006/0033350 | A1* | 2/2006 | Besch | B25B 5/065 |
| | | | | 294/119.3 |
| 2013/0106127 | A1* | 5/2013 | Lipson | B25J 15/0023 |
| | | | | 294/189 |
| 2015/0272749 | A1* | 10/2015 | Amend, Jr. | B25J 15/08 |
| | | | | 623/64 |
| 2015/0273864 | A1* | 10/2015 | Moehringer | B41J 11/002 |
| | | | | 347/16 |
| 2016/0339551 | A1* | 11/2016 | Morihara | B23Q 3/086 |
| 2017/0072572 | A1* | 3/2017 | Wagner | B25J 15/0616 |
| 2018/0281199 | A1* | 10/2018 | Bradway | B25J 15/0023 |
| 2018/0281464 | A1* | 10/2018 | Bradway | B41J 3/4073 |
| 2018/0281465 | A1* | 10/2018 | Liu | B41J 3/4073 |

OTHER PUBLICATIONS

U.S. Appl. No. 15/163,880, filed May 25, 2016, and entitled System for Printing on Three-Dimensional (3D) Objects by Wayne A. Buchar et al.

* cited by examiner

UNIVERSAL PART HOLDER WITH CONFORMABLE MEMBRANES

CROSS REFERENCE TO RELATED APPLICATIONS

Cross-referenced is commonly assigned U.S. application Ser. No. 15/477,127, filed Apr. 3, 2017, now U.S. Pat. No. 9,925,726, and entitled APPARATUS FOR HOLDING DURING THREE-DIMENSIONAL (3D) OBJECTS DURING PRINTING THEREON by Jeffrey J. Bradway et al; U.S. application Ser. No. 15/477,125, filed Apr. 3, 2017, and entitled VACUUM TUBE OBJECT CLAMPING ARRAY WITH CONFORMABLE PADS by Timothy P. Foley et al; U.S. application Ser. No. 15/477,126, filed Apr. 3, 2017, now US Publication No. 2018-0282086, and entitled UNIVERSAL PART GRIPPER WITH CONFORMABLE TUBE GRIPPERS by Linn C. Hoover et al; U.S. application Ser. No. 15/477,427, filed Apr. 3, 2017, now US Publication No. 2018-0281305, and entitled SPRING LOADED SUCTION CUP ARRAY GRIPPER by Paul M. Fromm et al; U.S. Application Ser No. 62/480,563, filed Apr. 3, 2017, now expired, and Ser. No. 15/626,200, filed Jun. 19, 2017, now U.S. Pat. No. 10,087,020, and entitled UNIVERSAL OBJECT HOLDER FOR 3-D PRINTING USING A CONFORMABLE GRIPPER BALL by Erwin Ruiz et al; U.S. application Ser. No. 15/477,439, filed Apr. 3, 2017, now US Publication No. 2018-0281306, and entitled UNIVERSAL PART GRIPPER USING 3-D PRINTED MOUNTING PLATE by Linn C. Hoover et al; U.S. application Ser. No. 15/477,454, filed Apr. 3, 2017, now US Publication No. 2018-0281199, and entitled APPARATUS FOR GENERAL OBJECT HOLDING DURING PRINTING USING MULTIPLE CONFORMABLE BALLS by Jeffrey J. Bradway et al; U.S. application Ser. No. 15/477,464, filed Apr. 3, 2017, now U.S. Pat. No. 9,925,799, and entitled AIR PRESSURE LOADED MEMBRANE AND PIN ARRAY GRIPPER by Paul M. Fromm et al; U.S. application Ser. No. 15/477,488, filed Apr. 3, 2017, now US Publication No. 2018-0281464, and entitled APPARATUS FOR REPEATABLE STAGING AND HOLDING OBJECTS IN A DIRECT TO OBJECT PRINTER USING AN ARRAY OF PINS by Jeffrey J. Bradway et al; U.S. application Ser. No. 15/477,478, filed Apr. 3, 2017, now U.S. Pat. No. 10,086,518, and entitled SPRING LOADED IRIS MECHANISM STACK GRIPPER by Paul M. Fromm et al; and U.S. application Ser. No. 15/645,189, filed herewith Jul. 10, 2017, now US Publication No. 2019-0009571, and entitled UNIVERSAL PART GRIPPER WITH CONFORMABLE GRIPPER BALL WITH VACUUM ASSIST by Linn C. Hoover et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto three-dimensional objects would be difficult. Since the surfaces to be printed must be presented to the print heads as relatively flat, 2-D surfaces, the objects have to be maneuvered carefully to present portions of the articles as parallel planes to the print heads One printing system that accomplishes this is disclosed in commonly assigned U.S. patent application Ser. No. 15/163,880, filed on May 25, 2016, now U.S. Pat. No. 9,827,784, and entitled SYSTEM FOR PRINTING ON THREE-DIMENSIONAL (3D) OBJECTS by Wayne A. Buchar et al. This printing system includes a plurality of print heads arranged in a 2-D array, each printhead being configured to eject marking material, a support member positioned to be parallel to a plane formed by the two-dimensional array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference for the practice of the present disclosure in its entirety.

A problem with this approach is that it requires a unique part holder for each part that is to be printed. The part holders are currently machined metal brackets with dedicated locating and fastening features machined into each holder. Unique holders are made for each part that is printed on.

SUMMARY

In answer to this shortcoming, disclosed is a holding apparatus for three-dimensional object printing. The holding apparatus includes a frame with sides and a solid bottom, a biasing membrane mounted at the midpoint of the frame height to form an air cavity between the frame and the biasing membrane, and a part gripping membrane mounted across the face of the frame. Granular material fills the space between the two membranes and ribs or protrusions attached to the frame project into the granular material to keep the material from shifting when the material is compressed. In gripping a part, the gripping membrane is stretched over the part, positive pressure is applied to the air cavity to compress the granular material and further stretch the gripping membrane over the part, and then vacuum is applied to the space between the two membranes to maintain the granular material compression and grip on the part. The positive pressure can then be released and the part moved into position for printing and curing.

BRIEF DESCRIPTION OF THE DRAWINGS

The foregoing aspects and other features of a printing system that prints images on 3-D objects are explained in the following description, taken in connection with the accompanying drawings.

DETAILED DESCRIPTION

Figure 1A:
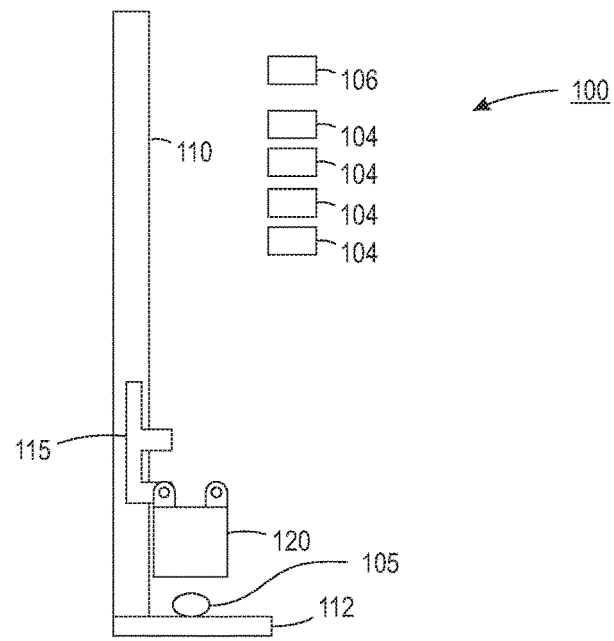
FIG. 1A illustrates an exemplary partial block printing system 100 configured to print on a 3-D part with a universal part holder positioned above a part resting on a part staging platen.

For a general understanding of the present embodiments, reference is made to the drawings. In the drawings, like reference numerals have been used throughout to designate like elements.

FIG. 1A illustrates an exemplary printing system 100 configured to print on a 3-D object. The printing system 100 includes an array of print heads 104, a curing station 106, a support member 110, a carriage member 115 movably mounted to support member 110 to be moved up or down in FIG. 1A. A universal object holder 120 is configured to pivotally mount to the movably mounted carriage member 115 and is adapted to pick up an object 105. Universal object holder 120 in FIG. 1A has been rotated from a vertical position parallel with carriage 115 into a position orthogonal to carriage member 115. As shown in FIG. 1A, the array of print heads 104 is arranged in a 2-D array, which in the figure is a 4×1 array, although other array configurations can be used. Each print head is fluidly connected to a supply of marking material (not shown) and is configured to eject marking material received from the supply. Some of the print heads can be connected to the same supply or each print head can be connected to its own supply so each print head can eject a different marking material.

The support member 110 is positioned to be parallel to a plane formed by the array of print heads and, as shown in FIGS. 1A-1D, is oriented so one end of the support member 110 is at a higher gravitational potential than the other end of the support member. This orientation enables the printing system 100 to have a smaller footprint than an alternative embodiment that horizontally orients the array of print heads and configures the support member, movably mounted member, and object holder to enable the object holder to pass objects past the horizontally arranged print heads so the print heads can eject marking material downwardly on the objects.

Figure 1B:
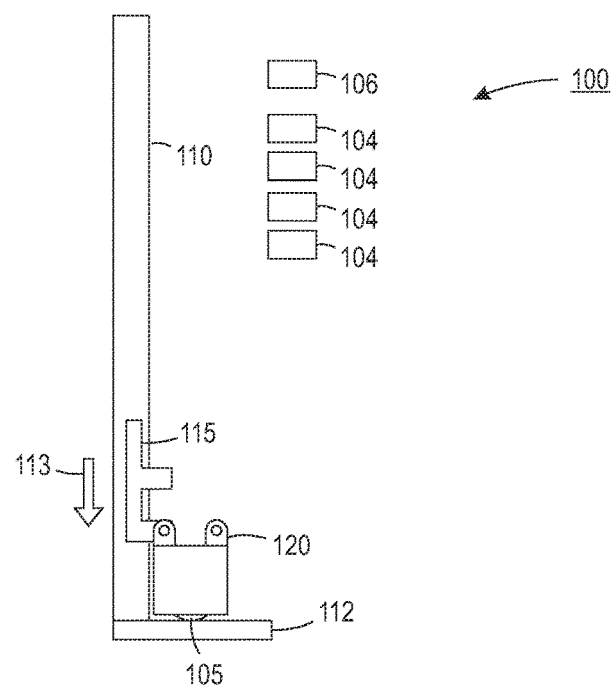
FIG. 1B illustrates the exemplary partial block printing system 100 in FIG. 1A with the universal object holder moved into a part capturing position.
Figure 1C:
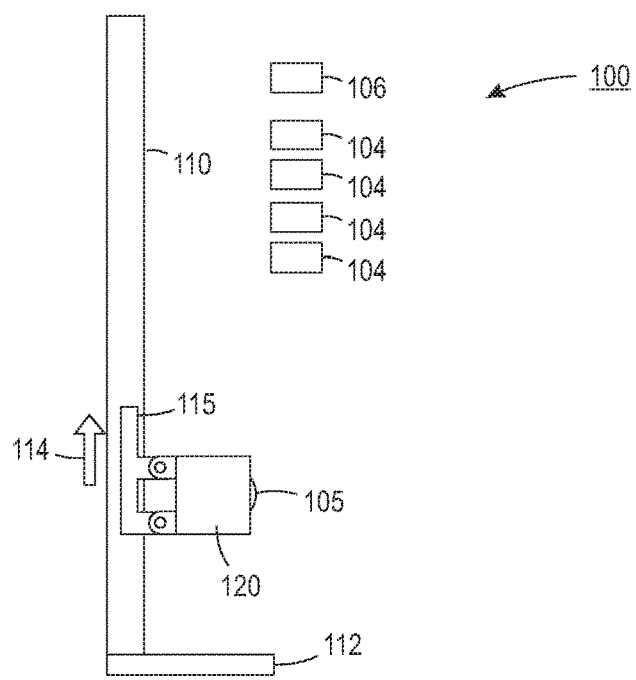
FIG. 1C shows the exemplary partial block printing system 100 in FIG. 1A with the universal object holder being moved towards print heads.
Figure 1D:
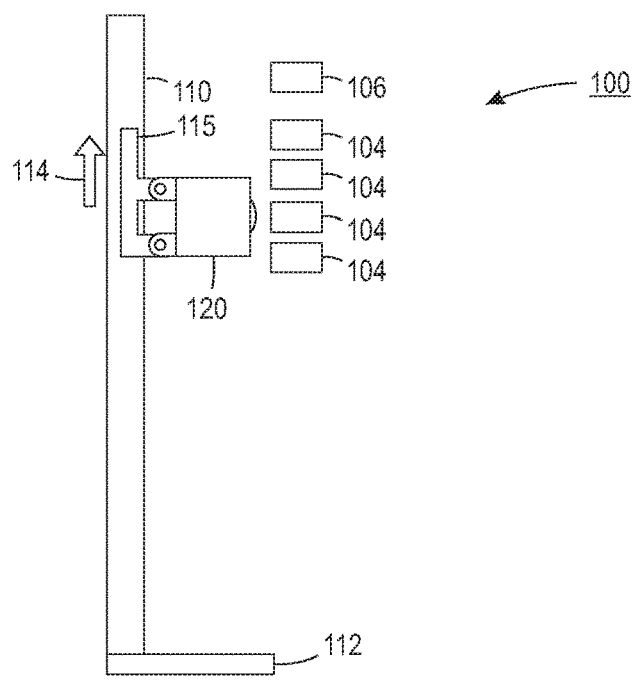
FIG. 1D depicts the exemplary partial block printing system 100 in FIG. 1A with the universal object holder being moved opposite print heads.

The carriage member 115 is movably mounted to the support member 110 to enable the carriage member to slide bi-directionally as shown by arrows 113 and 114 in FIGS. 1B-1D along the support member 110. In FIG. 1A, the universal object holder 120 has been rotated by carriage member 115 through conventional means into a first position or object acquiring positioned that is parallel to staging platen 112. Object 105 has been positioned onto staging platen 112 for acquisition. In FIG. 1B, the universal object holder 120 has lowered onto object 105 resting on the staging platen 112 by carriage member 115. In FIG. 1C, object 105 has been acquired and universal object holder 120 has been rotated into a second position and carriage member 115 in FIGS. 1C and 1D now moves object 105 along the length dimension of the array of print heads 104 and curing station 106 by conventional means, such as, with the use of pulleys and belts or a screw drive.

Figure 2:
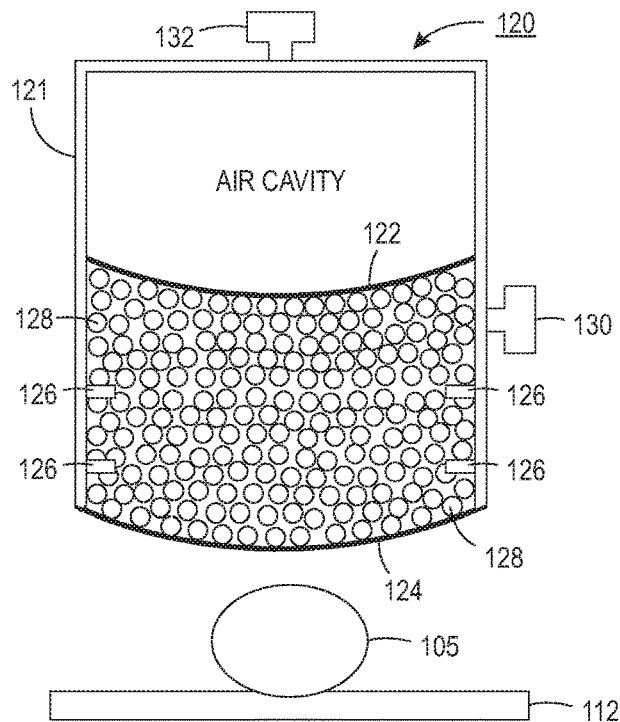
FIG. 2 is a cross-section view of the universal object holder in FIG. 1A positioned over a part resting on a staging platen.

Turning now to the present disclosure, a generic or universal object holder 120 is shown in FIG. 2 in a non-contacting position with respect to object 105 placed onto object platen 112 and includes a frame 121 with an enclosed bottom and a biasing elastomer membrane 122 mounted at a midpoint of the frame 121. A part gripping elastomer membrane 124 is mounted on the face of frame 121 and a bed of granular material, such as, beads 128 fill the space between the biasing membrane 122 and the biasing elastomer membrane 124. Ribs or extrusions 126 are spaced inside and around walls of frame 121 between the two membranes.

Figure 3:
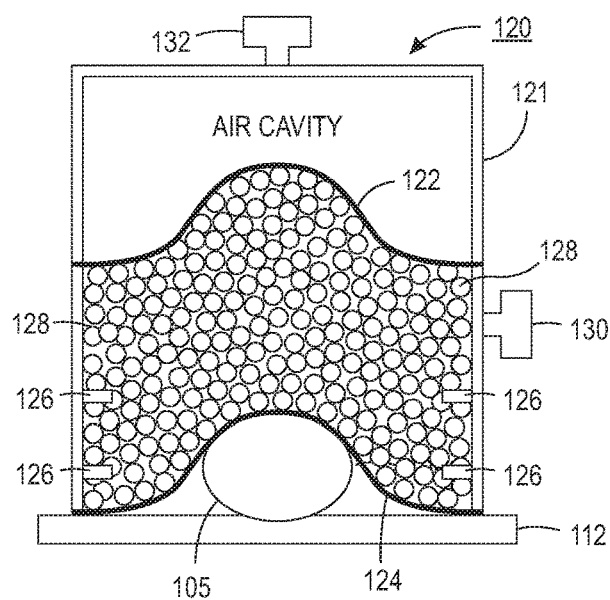
FIG. 3 shows a cross-section view of the universal object holder in FIG. 1B with the universal part holder lowered over a part with a gripping membrane conforming around the part.

In FIG. 3, object 105 is shown positioned on staging platen 112 with universal object holder 120 having been lowered against object 105. As a result, gripping membrane 124 stretches over object 105 with granular material 128 and biasing membrane 122 simultaneously conforming to the shape of gripping membrane 124.

Figure 4:
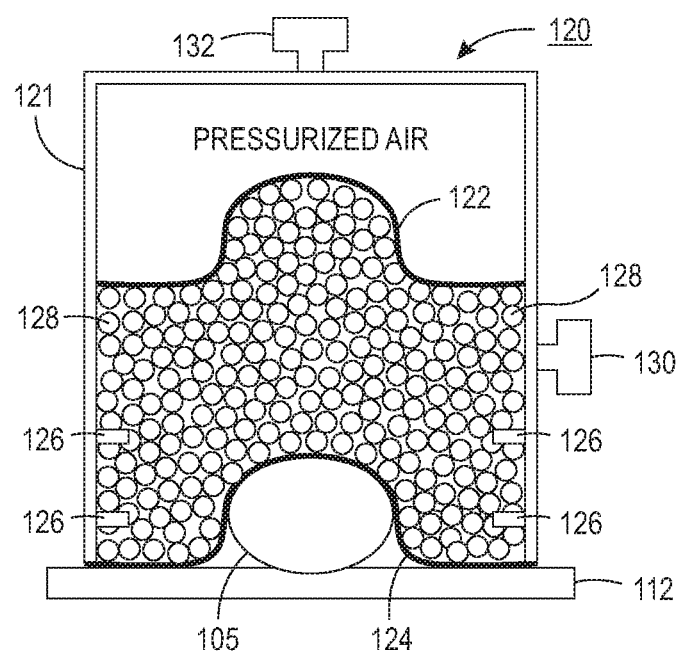
FIG. 4 depicts a cross-section view of the universal object holder in FIG. 1B after both pressurized air and vacuum pressures have been applied thereto.

In FIG. 4, pressurized air from source 132 is applied between frame 121 and biasing membrane 122 that further compacts granular material 128 and gripping membrane 124 around object 105. After the pressurized air is applied, a vacuum is applied to the space between biasing membrane 122 and gripping membrane 124 by vacuum source 130. The vacuum maintains the compaction of the granular material 128 between biasing membrane and gripping membrane when the air pressure is released form the biasing membrane 122. Granular material 128 also compacts around ribs 126 on the inside surface of frame 121 interlocking granular material 128, biasing membrane 122 and gripping membrane 124, respectively, and object 105 to frame 121 preventing these components from shifting when universal object holder 120 moves from staging platen 112 to the printing area adjacent print heads 104. The radius of curvature and degree of conformance of gripping membrane 124 to object 105 will depend on the stiffness of the gripping membrane and air pressure.

Once the printing cycle is complete, the vacuum on the holder is released allowing the object to fall freely for retrieval by an operator. Carriage member 115 also releases universal object holder 120 for rotation 90° into its first position horizontal with staging platen 112 for pickup of another object.

It should be understood that staging platen 112 may include a recess for an object to rest in or a shim plate that surrounds the object. The recess or shim plate would offset the object surface beyond gripping membrane 124 to provide additional clearance between print heads 104 and the gripping membrane 124 and holder frame 121.

In recapitulation, holding a variety of 3-D part sizes for printing thereon is accomplished with a generic part holder that includes a frame with a solid bottom. A biasing membrane is mounted at approximately the midpoint of the frame height and a part gripping membrane is mounted across the face of the frame. Granular material, such as, small plastic beads fills the space between the two compliant membranes. To grip a part, the frame is lowered over the part. The part gripping membrane on the face of the frame stretches around the part imprinting the part shape to the granular beads and biasing membrane. Air pressure is then applied to the cavity between the bottom half of the frame and biasing membrane. The air pressure against the biasing membrane compacts the beads and forces the part gripping membrane to conform around the part. The compacted beads form a semi-ridged filler between the two membranes. Vacuum is then applied to the space between the two membranes to maintain the bead compression and part gripping membrane contact with the part. The air pressure is released behind the biasing membrane. The part holder and now captured part are ready to be moved into the printing position.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An object holder for positioning objects in a predetermined location, comprising:
    a support;
    a pivotable pickup head movably mounted to said support and configured to grip an object at a first location, move said object to a second location and return said object to said first location;
    wherein said pickup head comprises a frame that includes a bottom portion with legs extending therefrom and a biasing membrane configured in a concave resting position connected to said legs forming a first chamber, said first chamber including air pressure access from an air pressure source and separated from a second chamber by said biasing membrane, said second chamber having only a vacuum pressure access thereto with said second chamber being defined by said biasing membrane and a gripping membrane connected to said legs of said frame and configured in a convex resting position; and
    wherein only said second chamber includes ribs on an inside surface thereof and granular material therein, said ribs being configured once vacuum pressure is applied to said second chamber to anchor said granular material, biasing and gripping membranes and said object to prevent shifting when said pickup head is moved.

2. The object holder of claim 1, wherein said biasing and gripping membranes are made of an elastomer.

3. The object holder of claim 2, wherein said gripping membrane is stretched over said object by lowering said pickup head onto said object and simultaneously causing said granular material to compact and biasing membrane to conform to the shape of said gripping membrane.

4. The object holder of claim 3, wherein pressurized air is applied within said first chamber to further compact said granular material and gripping membrane around said object.

5. The object holder of claim 4, wherein vacuum pressure is applied to said second chamber to maintain compaction of said granular material when said pressurized air is released from said first chamber.

6. The object holder of claim 5, wherein said biasing membrane is mounted at a midpoint of said frame.

7. The object holder of claim 5, wherein said gripping membrane is mounted on the face of and connected to ends of said legs of said frame.

8. The object holder of claim 1, wherein said granular material includes plastic beads.

9. The object holder of claim 8, including a carriage and wherein said pivotable pickup head is connected to said carriage member.

10. An object holding apparatus, comprising:
    a pickup head configured for rotary movement from a first position parallel to an object staging platen before gripping an object into a second position orthogonal to said first position after an object has been gripped, said pickup head including a pressure chamber adapted to receive pressurized air and a vacuum chamber with a vacuum source attached thereto, said pressure chamber being separated from said vacuum chamber by a biasing membrane having a concave shape in a non-contacting position, said vacuum chamber including a gripping membrane having a convex shape in a non-contacting position and including granular material and a plurality of protrusions extending out from only an inside surface thereof, and wherein vacuum pressure from said vacuum source causes said granular material to compact around said plurality of protrusions and thereby prevent said biasing membrane, said gripping membrane and said object from shifting once said pickup head is moved.

11. The apparatus of claim 10, wherein vacuum is applied to said vacuum chamber after pressurized air has been added to said pressure chamber and is maintained after pressurized air is released from said pressure chamber.

12. The apparatus of claim 10, wherein said pickup head includes a frame having a bottom portion with legs extending therefrom and said gripping membrane enclosing said legs.

13. The apparatus of claim 12, wherein said biasing membrane is positioned at a midpoint between said bottom portion of said frame and said gripping membrane to form an air cavity between said frame and said biasing membrane to facilitate unimpeded deformation of said biasing membrane and said gripping membrane during contacting of an object by said gripping membrane.

14. A part holding apparatus comprising:
    a frame with sides and a bottom enclosing one end of said frame;
    a biasing membrane mounted at a predetermined point within said frame to form an air cavity between said bottom of said frame and said biasing membrane;
    a part gripping membrane mounted across an opposite end of said sides;
    granular material positioned within a space between said biasing membrane and said gripping membrane;
    a series of ribs attached to said sides of said frame positioned only between said biasing membrane and said gripping membrane; and wherein said biasing membrane simultaneously conforms to the shape of said gripping membrane when said gripping membrane is pressed against an object.

15. The universal part holding apparatus of claim 14, including an air pressure source for providing air pressure to said air cavity.

16. The universal part holding apparatus of claim 15, including a vacuum pressure source for providing vacuum pressure to said space between said biasing membrane and said gripping membrane.

17. The universal part holding apparatus of claim 16, wherein said granular material includes plastic beads.

18. The universal part holding apparatus of claim 16, wherein said air pressure source is adapted to apply air pressure to said biasing membrane to compact said granular material and press said gripping membrane against a part, and wherein vacuum pressure is applied afterwards to maintain said compaction of said granular material and gripping membrane while in contact with said part.

19. The universal part holding apparatus of claim 14, wherein said universal part holding apparatus is incorporated into a printer that prints on 3-D objects.

\* \* \* \* \*